US012750816B2

(12) United States Patent
Chen et al.

(10) Patent No.: US 12,750,816 B2
(45) Date of Patent: Sep. 29, 2026

(54) SMART PAGE SCAN THROUGH ID SENSING

(71) Applicant: Apple Inc., Cupertino, CA (US)

(72) Inventors: Xianbo Chen, San Diego, CA (US); David J. Shaw, Ramona, CA (US)

(73) Assignee: Apple Inc., Cupertino, CA (US)

( * ) Notice: Subject to any disclaimer, the term of this patent is extended or adjusted under 35 U.S.C. 154(b) by 320 days.

(21) Appl. No.: 18/372,008

(22) Filed: Sep. 22, 2023

(65) Prior Publication Data

US 2024/0107498 A1 Mar. 28, 2024

Related U.S. Application Data

(60) Provisional application No. 63/409,702, filed on Sep. 23, 2022.

(51) Int. Cl.
*H04W 68/00* (2009.01)
*H04W 76/10* (2018.01)

(52) U.S. Cl.
CPC ......... *H04W 68/005* (2013.01); *H04W 76/10* (2018.02)

(58) Field of Classification Search
None
See application file for complete search history.

(56) References Cited

U.S. PATENT DOCUMENTS 12,490,231 B2 * 12/2025 Hong .................... H04W 68/02
2023/0092443 A1 * 3/2023 Zhang .................. H04W 76/19 455/426.1

* cited by examiner

*Primary Examiner* — Frantz Bataille
(74) *Attorney, Agent, or Firm* — Kilpatrick Townsend & Stockton LLP

(57) ABSTRACT

Techniques are described herein for smart page scanning through identifier sensing, An example method includes a first core receiving, by a first core of a first computing device, a first paging message from a second device at a first duration. The first computing device can determine that a second core of the first computing device is performing an operation that prevents completion of a paging process. The first computing device can determine a second duration for a second paging message based at least in part on determining that the second core is performing the operation. The first computing device can cause the second core to scan for the second paging message from the second computing device at the second duration. The second core can receive the second paging message at the second duration. The second core can transmit a paging response for establishing the connection with the second device.

20 Claims, 13 Drawing Sheets

SMART PAGE SCAN THROUGH ID SENSING

CROSS-REFERENCES TO RELATED APPLICATIONS

This application claims the benefit to U.S. Provisional Application No. 63/409,702, filed Sep. 23, 2022, entitled "Smart Page Scan Through Id Sensing," the disclosures which is incorporated by reference in its entirety and for all purposes.

BACKGROUND

Computing devices can communicate with each other using wireless technology, such as Bluetooth, which enables the devices to share data over a short distance. A computing device enabled with short-range communication technology can create a network by discovering and connecting with other short-range communication technology enabled computing devices. Once connected, the computing devices can share information with each other over the network.

DETAILED DESCRIPTION

The following detailed description refers to the accompanying drawings. The same reference numbers may be used in different drawings to identify the same or similar elements. In the following description, for purposes of explanation and not limitation, specific details are set forth, such as particular structures, architectures, interfaces, techniques, etc. In order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

Bluetooth is a wireless technology that can be used to enable computing devices to create a network (e.g., a piconet) and communicate over a short distance (e.g., 10 meters). Currently, Bluetooth technology can operate in 2.4 GHz range and is supported by two standards, Bluetooth Classic and Bluetooth Low Energy (LE). Bluetooth Classic can support two data rates, basic rate (BR), and enhanced data rate (EDR), and can be used for larger amounts of data than Bluetooth LE. Bluetooth LE can be optimized for low power consumption, and used in devices with limited battery life.

In general, a primary device (e.g., a Bluetooth headset, a Bluetooth speaker, Bluetooth earbuds) transitions between various primary states while establishing a connection with a secondary device (e.g., a smartphone, a laptop, a tablet). Initially, the primary device can be in a standby state, in which the device is unconnected with the secondary device. The primary device then transmits an inquiry as to any secondary devices within a threshold distance. The primary device then pages any secondary devices that respond to set up a physical channel and a logical channel and establish a connection. Once the connection is established, the primary device enters a connected state in which it is connected with at least one secondary device.

A primary Bluetooth device and a secondary Bluetooth device can connect using an inquiry process followed by a paging process. During the paging process, the secondary device can listen for paging messages from the primary device at regular intervals. If primary device does not hear a paging message from the primary device at one interval, the secondary device waits for the next interval to again listen for a paging message. As a result, the second device cannot connect with the primary Bluetooth device until the next interval. Embodiments, herein address this situation by providing techniques for permitting the secondary device to schedule listing for the paging message prior to the next interval.

Figure 1:
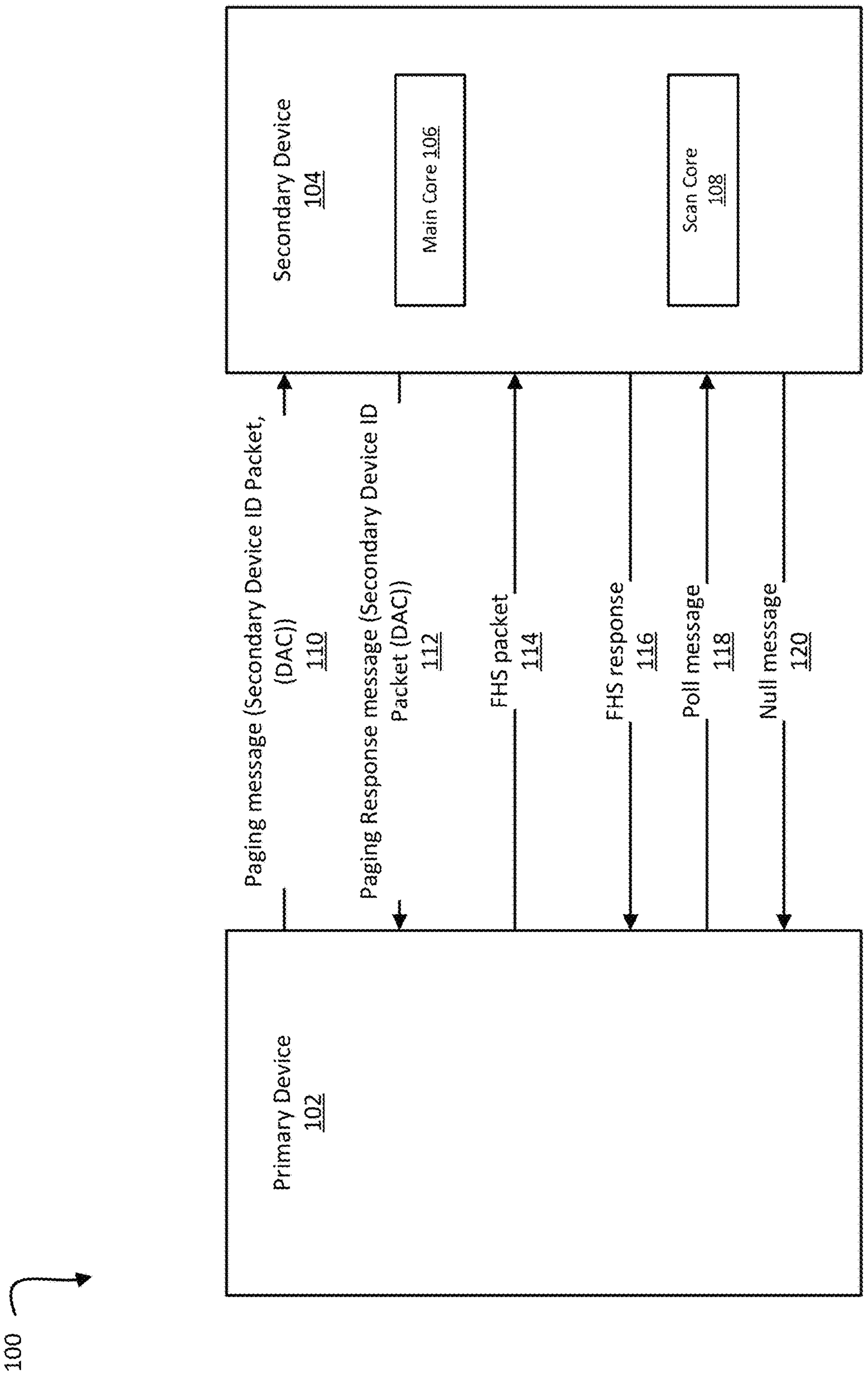
FIG. 1 illustrates an example paging process between a primary device and a secondary device, according to one or more embodiments.

FIG. 1 illustrates an example paging process 100 between a primary device and a secondary device, according to one or more embodiments. A primary device 102 can be in operable communication with a secondary device 104 via short range communication protocol. The secondary device 104 can have a dual core architecture, including a main core 106 and a scan core 108. Each of the main core 106 and the scan core 108 can be a distinct processor that operates on the same integrated circuit (IC) of the secondary device 104. The main core 106 can have both reception and transmission capabilities. If a scan core 108 has only reception capability, it might need MC's assistance when operations involve transmission. If the scan core 108 has both reception and transmission capabilities, the transmission capability might be suppressed by activities of the main core 106. As such, the secondary device 104 may only service one transmission at one time. In some embodiments, the scan core 108 can include a lower power design. The interaction and scheduling among the cores can be handled by coordination and scheduling logic. The schedule logic can be implemented by could be a central processing unit and memory based or dedicated hardware of the secondary device 104.

Initially, the primary device 102 can engage in an inquiry process to discover a nearby secondary device 104. The primary device 102 can transmit an inquiry request to discover a nearby secondary device 104. Upon receiving the inquiry request, a secondary device 104 that is discoverable (e.g., the secondary device is turned on) can transmit an inquiry response that includes the secondary device's address, identifier, and other information to the primary device 102, such that the secondary device is discovered. Once the primary device 102 discovers the secondary device 104, the primary device 102 can proceed with the paging process. Furthermore, the primary device 102 and the secondary device 104 can set up the network (e.g., piconet) during the paging process. A paging process is described below.

At 110, the primary device 102 can transmit a paging message to be received by the secondary device 104. The primary device 102 can use a set of channels that are designated for paging to transmit the paging message. In some instances, the number of channels is 32 channels. The primary device 102 can separate the set of channels into two channel trains. For example, if there are 32 channels, the primary device 102 can separate the channels into two 16 channel trains. Each paging message can include the secondary device's identifier (e.g., a device access code (DAC)), and the primary device 102 can listen for a response from the secondary device 104.

If the primary device 102 does not receive a response from the secondary device 104, the primary device 102 can transmit paging messages using the next two channels of the channel train. This hopping sequence can repeat, for example, every 10 milliseconds (e.g., 16 slots). To provide the secondary device 104 ample opportunity to respond, the primary device 102 can repeat the process. For example, in some instances, the primary device 102 can repeat the process 256 times at 10 milliseconds each cycle for a total of 2.56 seconds.

The secondary device 104, and in particular, a scan core 106 of the secondary device 104, can be configured to be in a page scan state listen for a message from the primary device 102 over the set of channels. In some embodiments, the secondary device 104 can listen various page scan repetition modes. In the first mode, the secondary device 104 can continuously listen for a paging message from the primary device 102. In a second mode, the secondary device 104 can periodically listen for a page from the primary device 102 (e.g., every 1.28 seconds). In a third mode, the secondary device 104 can periodically listen on each channel (e.g., 11.25 milliseconds per channel) for a page from the primary device 102 every 2.56 seconds.

In response to a receiving a paging message, the secondary device 104 can transmit a paging response that includes the secondary device's DAC at 112. The paging response can confirm to the primary device 102 that the intended recipient device for the paging message at 110 is the device that received the paging message.

In response to receiving the paging response, the primary device 102 can suspend its frequency hopping generator and transmit a frequency hopping sequence (FHS) packet to the secondary device 104 at 114. As the primary device 102 and the secondary device 104 are not connected, it is likely that the devices are using the same frequency hopping sequence. The FHS packet includes primary device frequency information, primary device clock information, and other appropriate information for synchronizing the primary device 102 and the secondary device 104. The secondary device 104 can use the information to synchronize its clock with the primary device's clock. At 116, the secondary device 104 can transmit an FHS response message to the primary device indicating that it has synchronized with the primary device 102. In response to receiving the FHS response message, the primary device 102 can resume its frequency hopping and assign the secondary device 104 an address (e.g., an active member address (AMA)) for the network (e.g., piconet).

At 118, the primary device 102 can start a timer and transmit a poll message to the secondary device 104 to confirm that the secondary device 104 is using the primary device's frequency hopping sequence. At 120, the secondary device 104 can respond to the primary device 102 with a null message that is transmitted on the correct timer. The primary device 102 can establish a connection with the secondary device 104 based on the receiving the null packet prior to the expiration of the timer.

Both the main core 106 and the scan core 108 can be configured for page scanning. The main core 106 can be configured to scan for a paging message from the primary device 102 over a first duration (e.g., one duration every 1.28 seconds). As the scan core 106 is a low power core, the scan core 108 can be configured to scan for a paging message at a second duration (e.g., one duration every 300 seconds). One issue that can occur is that main core's activities (e.g., transmission) can suppress the scan core's activities. For example, only one of the main core 106 or the scan core 108 can transmit at any given time. Therefore, in some instances, the scan core 108 can detect a paging message from the primary device 102, and be unable to respond because the main core 106 is busy and suppresses the activities of the scan core 108. Busy can refer to a state of the main core 106, in which the main core's radio resources are being used (e.g., for a synchronous connection oriented (SCO) link, extended SCO (eSCO) link, Bluetooth (BT) link, low energy (LE) BT link, asynchronous connection less (ACL) link, LE ACL link, LE advertisement, thread scan, etc.), which prevents the scan core 108 from continuing the page scan process after it detects the paging message.

In a conventional system the scan core 108 can discard the DAC and wait until (e.g., 300 milliseconds after first scan core scan) to perform a second scan core scan for a paging message, or the main core 106 can perform a second main core scan (e.g., 1.28 seconds after first main core scan). However, this results in the secondary device 104 waiting for at least 300 millisecond to resume page scanning. The primary device 102 and the secondary device 104 could establish the connection sooner if a page scan occurred prior to the 300 milliseconds.

Embodiments herein address the above described issues by providing techniques for permitting a scan core 108 to receive a paging message from the primary device 102. The secondary device 104 can then determine whether the main core 106 is busy or can the main core 106 assist the scan core 108 with establishing a link with the primary device 102. If the main core 106 can assist the scan core 108, then the main core 106 will assist to establish the connection with the primary device 102. If, however, the main core 106 is busy, the scan core 108 can retain the time and frequency information from the received paging message. The secondary device 104 can use coordination and scheduling logic, and a known time interval for the primary device 102 transmitting scanning messages (e.g., once every 10 milliseconds) and frequency used to transmit the paging message to predict a schedule as to each subsequent paging message. The coordination and scheduling logic can then schedule a new predictive scan duration for the main core 106 to scan for paging messages based on the primary device's paging message schedule. This paging message schedule-based scanning duration can occur prior to the main core's previously scheduled scanning duration and the scan core's previously scheduled scanning duration. Therefore, if the main core 106 receives a paging message before either an expiration of a 300 millisecond interval or an expiration of a 1.28 second interval, the primary device 102 and the secondary device 104 can establish a connection faster than if the secondary device did not schedule the paging message-based scanning duration for the main core 106.

Figure 2:
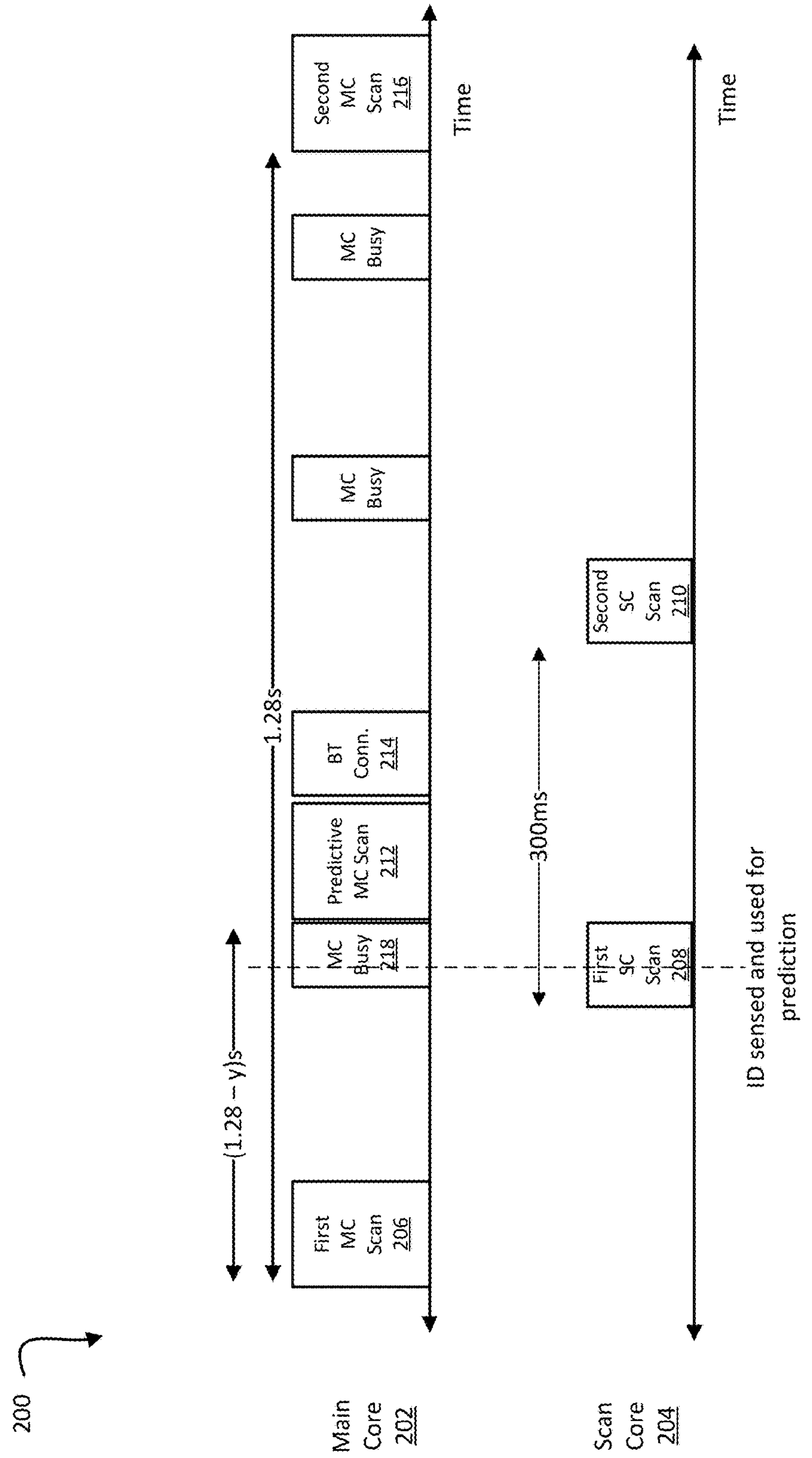
FIG. 2 illustrates smart page scanning through identifier (ID) sensing, according to one or more embodiments.

FIG. 2 is an illustration 200 of example smart page scanning through identifier (ID) sensing, according to one or more embodiments. As illustrated a main core 202 and a scan core 204 of a secondary device are engaged in a page scanning process. In some embodiments, the main core 202 can be configured to perform a scan for a paging message one every 1.28 seconds. The main core 202 can perform a scan during first main core (MC) scan duration 206 and fail to detect a paging message from a primary device. Afterwards, the scan core 204 can perform a scan first SC scan duration 208 scan for a paging message from the primary device. In this instance, the scan core 204 can receive a paging message from the primary device. In some instances, the paging message is a baseband packet data unit (BB_PDU). The paging message can include a secondary device packet ID (e.g., a DAC). The paging message can further be used to determine time and frequency information. However, as illustrated by the dashed line, the main core 202 is busy at the time the scan core 204 detects the paging message, and cannot assist the scan core 204 to establish a connection between the secondary device and the primary device.

In a conventional paging process, the scan core 204 would discard the paging message information and the scan core 204 would perform a second SC scan 210 after a time interval passes (e.g., after 300 milliseconds). In the herein described paging process, the secondary device can determine the time the paging message was received and the frequency used to transmit the paging message. The secondary device can further use the determined timing and frequency information to predict the arrival of a next paging message from the primary device. For example, the secondary device can be configured with reference timing information for paging messages (e.g., a primary device transmits a paging message once every 10 milliseconds). Based on the time that the scan core 204 received the paging message, the secondary device can determine the next time that a paging message from the primary device can be expected. For example, if the scan core 204 received a first paging message at time x, the secondary device can predict a schedule indicating that a subsequent paging messages is to be received at x+10 ms, x+20 ms, and so forth.

The secondary device can further configure the main core 202 with a paging message schedule and cause the main core 202 to perform a scan during a predictive MC scan duration 212 based on the schedule. As illustrated in FIG. 2, the main core 202 had originally been configured to perform a scan at the second MC scan duration 216 1.28 seconds after the first MC scan duration 206. However, now the main core 202 can perform the scan at the predictive MC scan duration 218 before the second MC scan duration 216. For example, the main core 202 can perform the scan at 1.28−y seconds after the first scan. It should be appreciated that the main core 202 can continue to be configured to perform the second scan at the second MC scan duration 216. It should further be appreciated if the main core 202 is busy the main core 202 could perform a scan at a next predictive MC scan duration identified by the schedule. For example, if the main core 202 is busy during the duration at x+10 ms, then the main core 202 can perform a scan at x+20 ms.

During the predictive MC scan duration 212, the main core 202 can detect a paging message from the primary device. Based on the detecting the paging message, the secondary device can perform the paging process as described in FIG. 1 to establish a connection with the primary device using a short range transmission protocol, such as Bluetooth.

Figure 3:
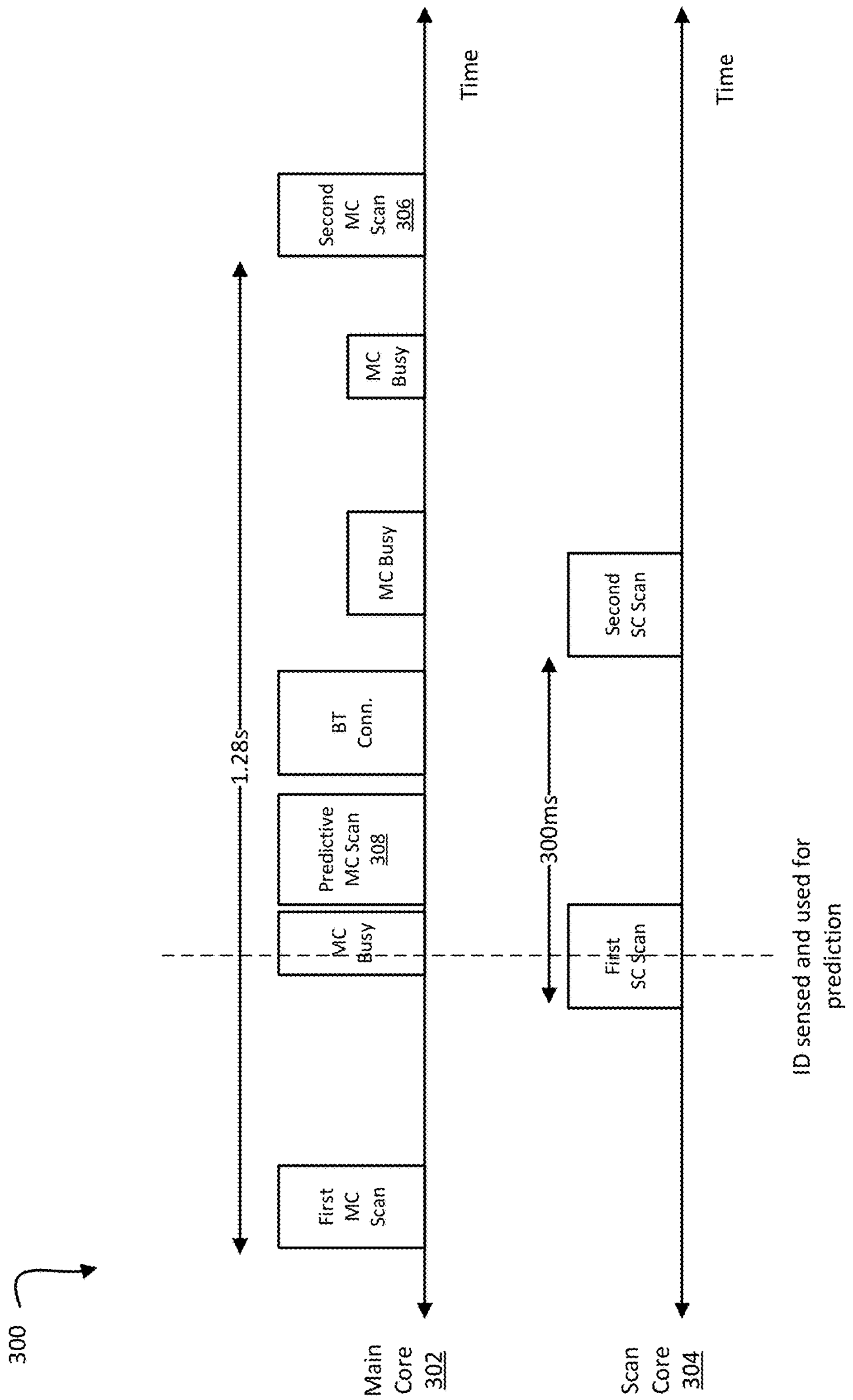
FIG. 3 illustrates smart page scanning through ID sensing, according to one or more embodiments.

FIG. 3 is an illustration 300 of example smart page scanning through ID sensing, according to one or more embodiments. FIG. 3 is illustrative of time saving features of the herein described embodiments. Referring back to FIG. 2, it is illustrated that even if the main core 202 is busy during a MC busy duration 218 when the scan core 204 detects the paging message, the main core 202 is not busy during the second SC scan duration 210. Therefore, if the main core is unable to perform a predictive MC scan prior to the second SC scan duration 210, the scan core 204 can perform the second SC scan to detect the paging message from the primary device. As the main core 202 is not busy during the second SC scan 210, the main core 202 can assist with establishing a connection with the primary device.

In some instances, the main core 302 is busy each time that the scan core 304 performs a scan for a paging message. Therefore, even if the scan core 304 detects a paging message, the main core 302 will be unable to assist with establishing a connection with the primary device. In a conventional paging process, the secondary device may need to wait until the second MC scan duration 306 to detect a paging message from the primary device. As illustrated, the scan core 304 can detect a paging message, including a secondary device identifier and transmit a message to the coordination and scheduling logic of the secondary device to determine a schedule of predicted paging message from the primary device. The coordination and scheduling logic can further configure the main core 302 to perform a scan at a predictive MC scan duration 308 based on the schedule. As illustrated, even if the scan core's scan for a paging message coincide with MC busy durations, the predictive MC scan 308 permits the secondary device to establish a connection with the primary device faster than waiting for the second MC scan 306. In some instances, the connection with the primary device can be established 1 second faster than if the secondary device waited until the second MC scan 306 to detect the paging message.

As indicated above, the scan core's transmission capability might be suppressed by main core's activities. Therefore, if the scan core 304 is scanning for a page during a time duration that the main core 302 is busy, even if the scan core 304 detects a page, the main core 302 may not assist with the paging process. Furthermore, if the scan core 304 is scanning for a page, even if the main core 302 is busy, the scan core 304 is drawing power from the secondary device. Therefore, in order to preserve power and possibly extend a battery life, the secondary device can use a predictive algorithm to predict when the main core 304 is busy. The secondary device can then schedule the scan core 304 to power down during main core busy durations. The scheduling can include scheduling the scan core 304 to scan for a paging message during a period in which the main core 302 is not busy, or adjusting a previously scheduled scan core duration, such that the SC scan duration does not occur simultaneously to a MC busy duration.

Figure 4:
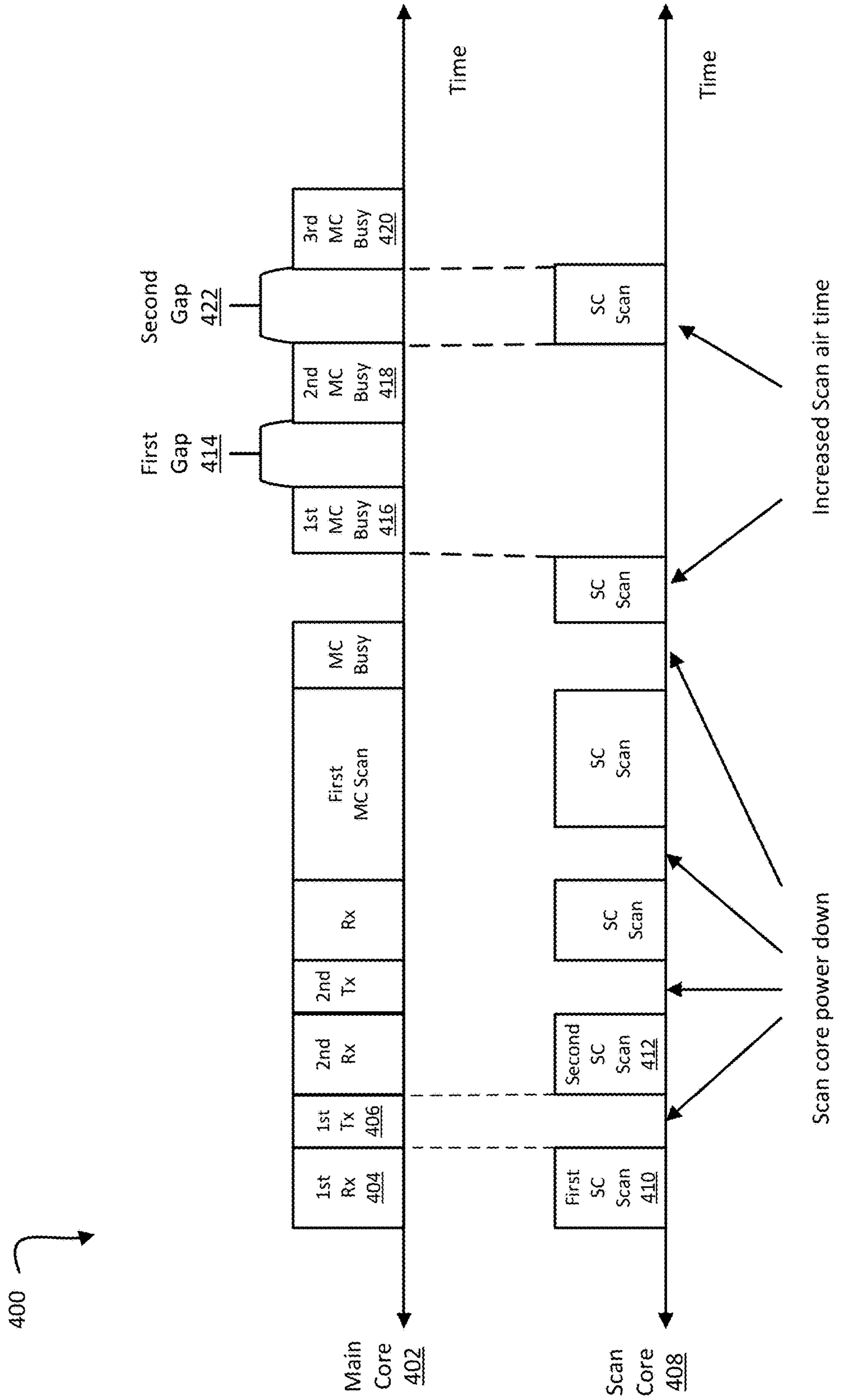
FIG. 4 illustrates smart low energy (LE) page scanning through ID sensing, according to one or more embodiments.

FIG. 4 illustrates smart low energy (LE) page scanning through ID sensing, according to one or more embodiments. As illustrated, a main core 402 can be scheduled to perform reception 404 and transmission 406 during alternating durations. A scan core 408 can perform an SC scan for a paging message from a primary device. However, when the main core 402 is busy (e.g., performing a transmission), the main core 402 cannot assist the scan core 408. Therefore, if the scan core is scanning during the transmission duration, the scan core 408 may be drawing power scanning for a paging message for which it may be unable to establish a connection with the primary device. Therefore, it can be seen in FIG. 4, the scan core 408 perform SC scans, such that there are gaps between SC scan instances, in which the scan core 408 is not scanning for paging messages and powered down. For example, the first SC scan 410 and the second SC scan 412 are distinct durations with a gap in between.

FIG. 4 also shows durations in which the main core 402 is busy. As indicated above, the main core 402 can be busy when it resources are being used such that the main core 402 cannot assist the scan core 408 with the paging process. Therefore, during a duration, in which the main core 402 is busy, the scan core 408 can power down and not perform an SC scan. In other words, as the main core alternates between durations in which the main core 402 cannot assist with a paging process and durations in which the main core 402 is not busy, the scan core 408 can alternate between durations in which an SC scan is performed and durations in which an SC scan is not performed. As illustrated, the main core 402 is busy at a first transmission duration 406. However, the main core 402 can assist with the reception of one signal for an operation, and simultaneously assist with the transmission of a paging message for a paging process. Therefore, during the first reception duration 404 the main core 402 is not considered busy, such that main core 402 is unable to assist the scan core 408 with the paging process.

In a conventional system the scan core 408 may continuously scan for a paging message from the starting time of the first SC scan duration 10 to the ending time of the second SC scan duration 412. Therefore, even during the first transmission duration 406, in the conventional system the scan core 408 can scan simultaneously scan as the main core 402 is busy. The scan core's page message scanning requires energy and can lead to draining the secondary devices battery. As the main core 402 is busy during the first transmission duration, the battery drain may from page scanning can be unnecessary. As illustrated via the dashed lines, the herein described techniques can be used to schedule the page message scanning, such that the first SC scan duration 410 and the second SC scan duration 412 do not occur at the same time as the first transmission duration 406. Various method for scheduling a scanning duration to not occur during a busy duration are described with more particularity with respect to FIGS. 5-8.

One issue that can occur for scheduling an SC scan, is whether a time interval between too busy durations is long enough to perform an SC scan. As illustrated, a gap between a first MC busy duration 416 and a second MC busy duration 418 may or may not include enough time to perform the page scanning. For example, the secondary device can determine (e.g., using a predictive algorithm) an ending time for the first MC busy duration 416, and a starting time for the second MC busy duration 418. The secondary device can further use this information to determine a length of time of the first gap 414. For example, by subtracting the starting time of the second MC busy duration 418 from the ending time of the first MC busy duration 416. The secondary device can then compare the length of time of the first gap 414 to a threshold length of time. As illustrated, the length of time is less than the threshold length of time, therefore the secondary device may elect to not schedule an SC scan for a time period corresponding to the first gap 414.

As another example, the secondary device can determine (e.g., using a predictive algorithm) the ending time of the second MC busy duration 418 and the starting time of a third MC busy duration 420. The secondary device can further use this information to determine a length of time of the second gap 422. For example, by subtracting the starting time of the second MC busy duration 418 from the ending time of the first MC busy duration 416. The secondary device can then compare the length of time of the second gap 422 to a threshold length of time. As illustrated, if the length of time is greater than the threshold length of time, the secondary device may elect to schedule an SC scan for a time period corresponding to the second gap 422.

The techniques described herein can also lead to increased scan time. As illustrated below the SC scan durations are scheduled outside of MC busy durations. In other words, the scan core 404 is not expending energy scanning for paging messages during MC busy durations. As such, the time that the scan core 404 spends scanning for paging messages is time that the main core 402 and scan core 404 can assist to complete the paging process and establish a connection with a primary device.

FIGS. 5-8 are provided to illustrate various scenarios for determining a duration of a scan core scan. The techniques described herein permit the secondary device to use a predictive algorithm to determine one or more of a starting time of a MC busy duration, a length of time of the MC busy duration, and an ending time of the MC busy duration. The predictive algorithm can further be used to determine the starting time and ending time of a SC scan duration.

Figure 5:
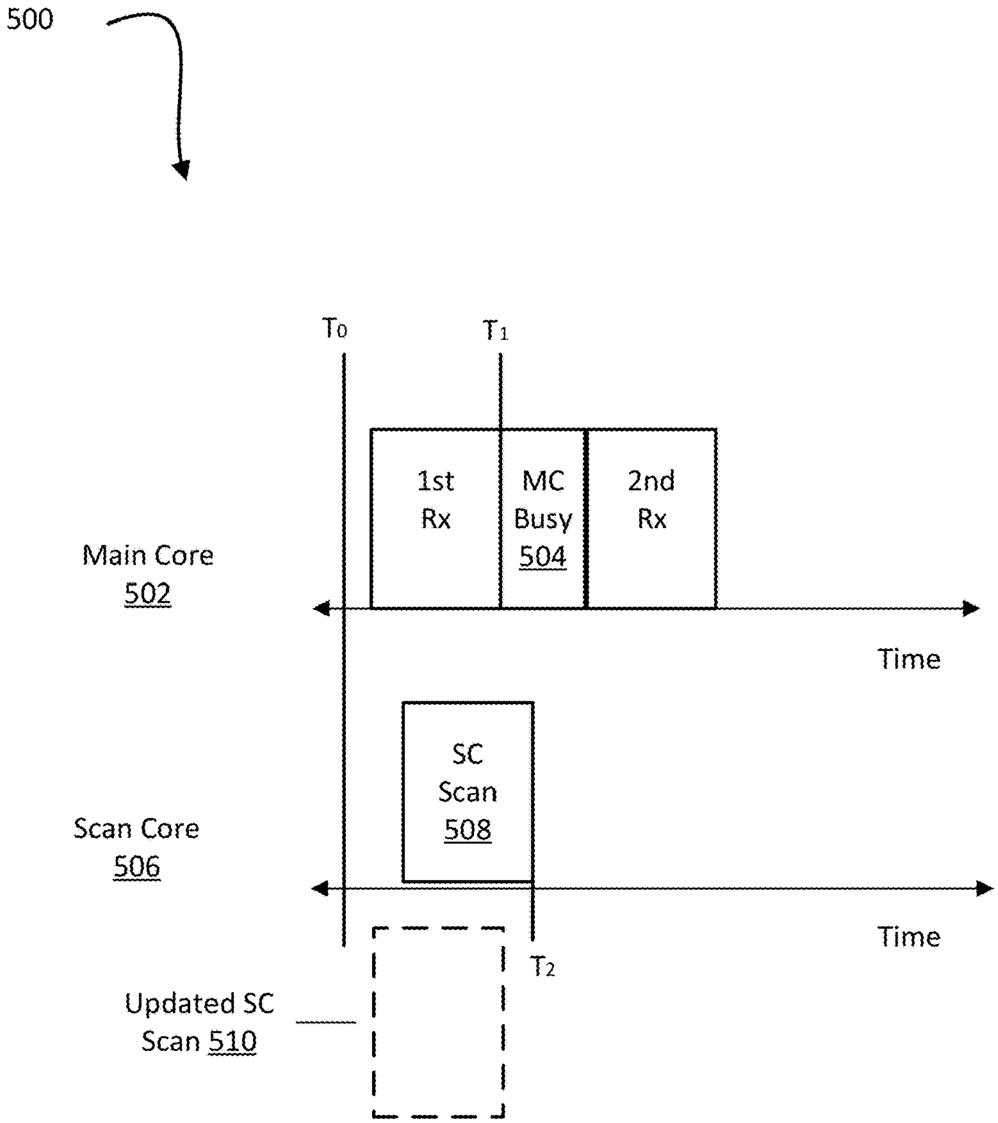
FIG. 5 illustrates an example scenario for determining a duration of a scan core scan, according to one or more embodiments.

FIG. 5 illustrates an example scenario 500 for determining a duration of a scan core scan, according to one or more embodiments. Consider at time point $T_0$, the secondary device can determine that main core 502 will engage an MC busy duration 504 at starting time $T_1$. The secondary device can further determine that the scan core 506 is scheduled for an SC can duration 508 with an ending time $T_2$. As both the main core 502 and the scan core 506 run on the secondary device's clock, the secondary device can determine that the end portion of the SC scan duration 508 occurs simultaneously to the MC busy duration 504. Therefore, the secondary device can determine a new SC scan duration, such that the ending time of the SC scan duration 508 corresponds to $T_1$, the starting time of the MC busy duration 504. For illustration purposes, an updated SC scan 510 is shown. In some instances, the secondary device can further compare the length of time of the updated SC scan duration 510 to a threshold duration time. If the length of time of the updated SC scan duration 510 is less than the threshold duration time, the secondary device can adjust the starting time of the updated SC scan duration 510 to reach the threshold duration time. If, however, the length of time of the updated SC scan duration 510 is greater than the threshold duration time, the secondary device can elect to keep the starting time of the updated SC scan duration 510. The starting time of the updated SC scan duration 510 corresponds to the starting time of the SC scan duration 508. The ending time of the updated SC scan duration 510 corresponds to $T_1$. During the updated SC scan duration 510, the scan core 506 can scan for a paging message from a primary device. In the event that the scan core 506 detects a paging message, the main core 502 can assist with the paging process.

Figure 6:
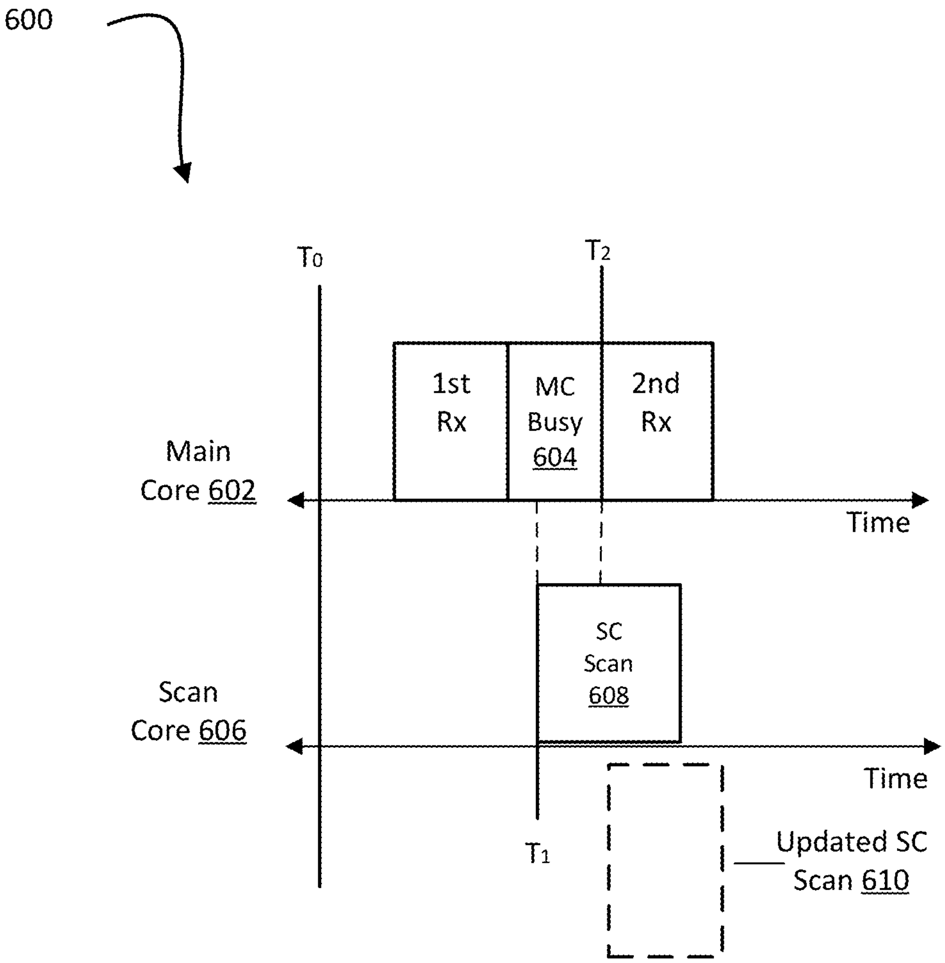
FIG. 6 illustrates an example scenario for determining a duration of a scan core scan, according to one or more embodiments.

FIG. 6 illustrates an example scenario 600 for determining a duration of a scan core scan, according to one or more embodiments. Consider at time point $T_0$, the secondary device can determine that main core 602 will engage an MC busy duration 604 with ending time $T_2$. The secondary device can further determine that the scan core 606 is scheduled for an SC scan duration 608 with a starting time $T_1$. The secondary device can determine that the starting portion of the SC scan duration 608 occurs simultaneously to the MC busy duration 604. Therefore, the secondary device can determine a new SC scan duration, such that the starting time of the SC scan duration 608 corresponds to $T_2$, the ending time of the MC busy duration 604. For illustration purposes, an updated SC scan 610 is shown. In some instances, the secondary device can further compare the length of time of the updated SC scan duration 610 to a threshold duration time. If the length of time of the updated SC scan duration 610 is less than the threshold duration time, the secondary device can adjust the ending time of the updated SC scan duration 610 to reach the threshold duration time. If, however, the length of time of the updated SC scan duration 610 is greater than the threshold duration time, the secondary device can elect to keep the starting time of the updated SC scan duration 610. The ending time of the updated SC scan duration 610 corresponds to the ending time of the SC scan duration 608. The starting time of the updated SC scan duration 610 corresponds to $T_2$. During the updated SC scan duration 610, the scan core 606 can scan for a paging message from a primary device. In the event that the scan core 606 detects a paging message, the main core 602 can assist with the paging process.

Figure 7:
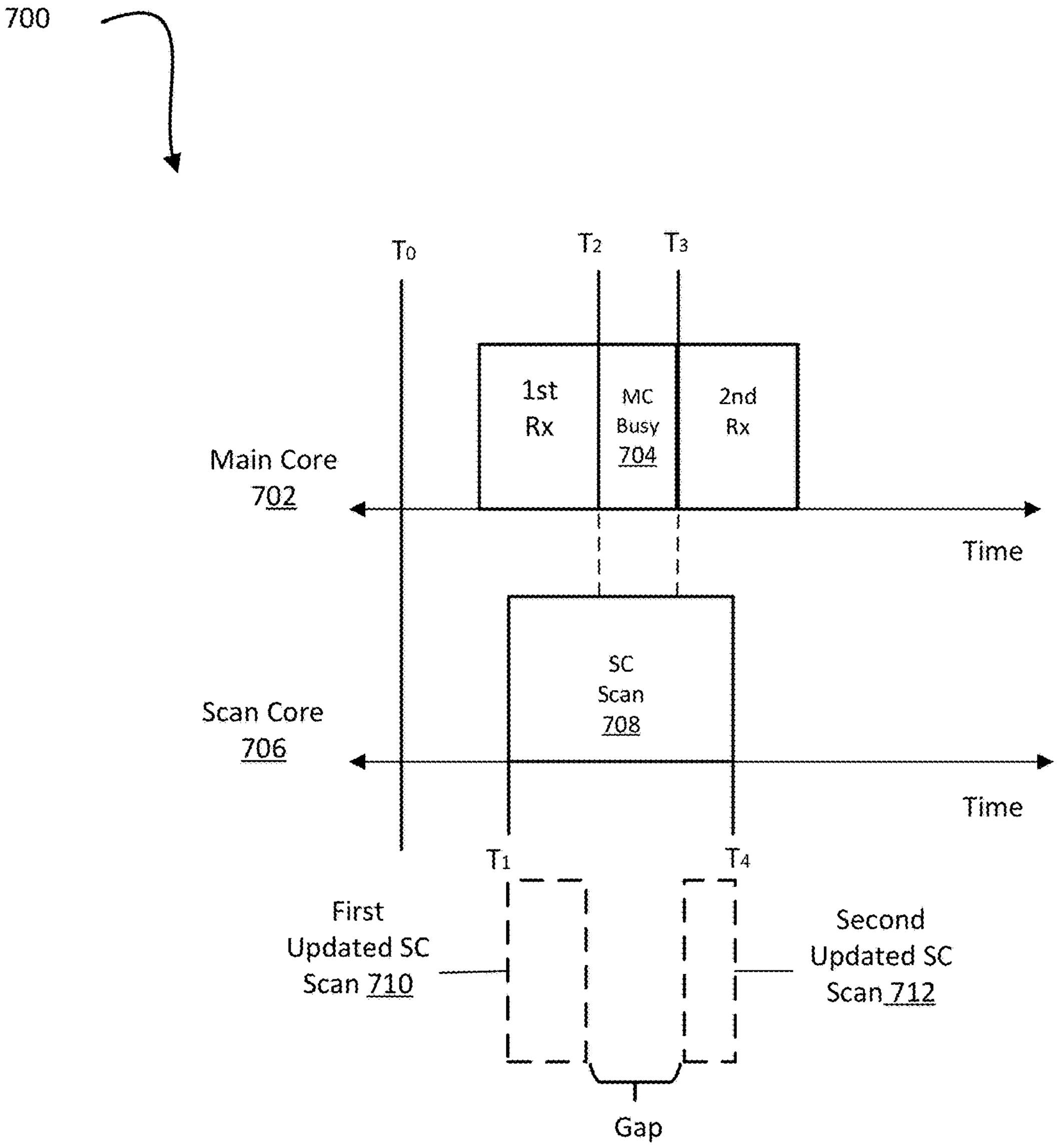
FIG. 7 illustrates an example scenario for determining a duration of a scan core scan, according to one or more embodiments.

FIG. 7 illustrates an example scenario 700 for determining a duration of a scan core scan, according to one or more embodiments. The secondary device can determine that main core 702 will engage an MC busy duration 704 with starting time $T_2$ and ending time $T_4$. The secondary device can further determine that the scan core 706 is scheduled for an SC scan duration 708 with a starting time $T_1$. In this instance, the secondary device can schedule a first updated SC scan duration 710 and a second SC scan duration 712. The first updated SC scan duration 710 can have starting time $T_1$ and an ending time $T_2$. The second updated SC scan duration 712 can have a starting time $T_3$ and an ending time $T_4$. In some instances, the secondary device can further compare the length of time of the first updated SC scan duration 710 and the second updated SC scan duration 712 to a threshold duration time. If the length of time of either updated SC scan duration is less than the threshold duration time, the secondary device can adjust the starting time or ending time of that updated SC scan duration to reach the threshold duration time. If, however, the length of time of both the first updated SC scan duration 710 and second updated SC scan duration 712 are greater than the threshold duration time, the secondary device can elect to keep the starting time and ending time of each updated SC scan duration. During either the first updated SC scan duration 710 or the second updated SC scan duration 712, the scan core 706 can scan for a paging message from a primary device. In the event that the scan core 706 detects a paging message, the main core 702 can assist with the paging process.

Figure 8:
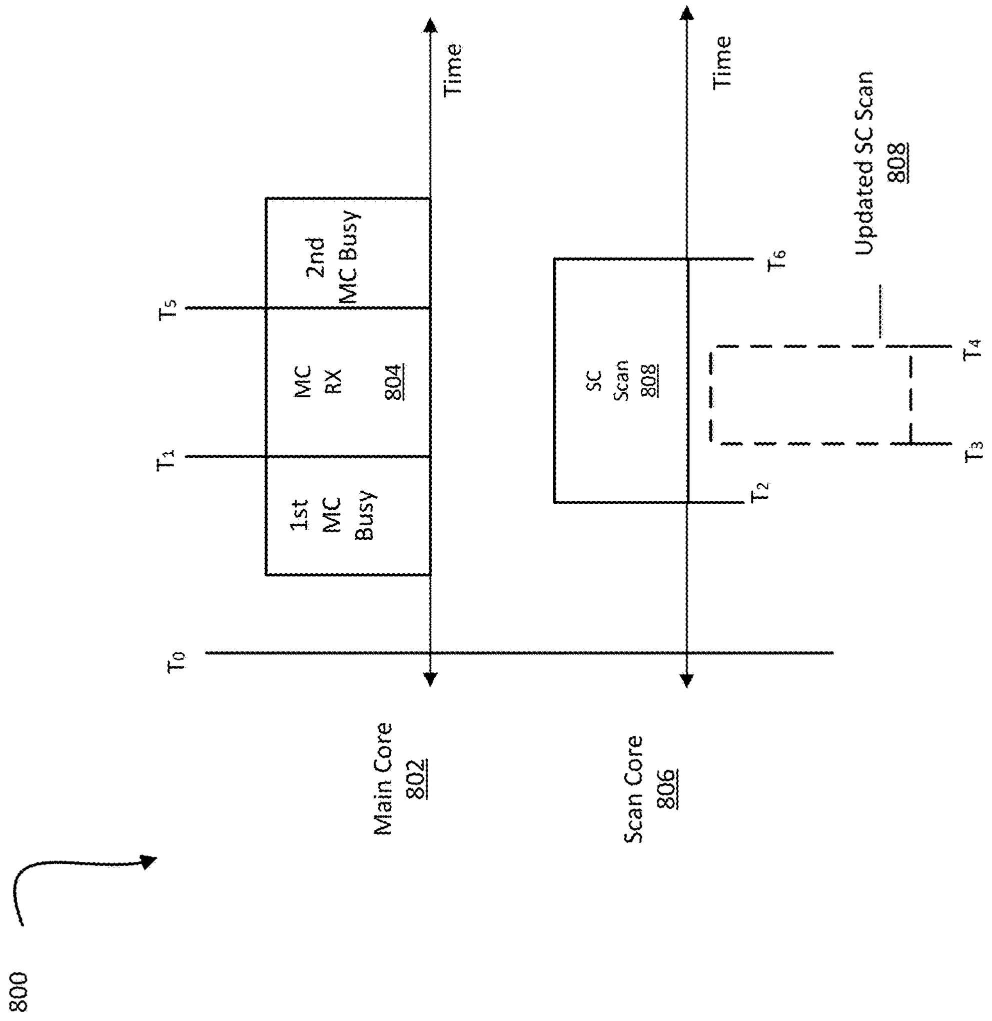
FIG. 8 illustrates an example scenario for determining a duration of a scan core scan, according to one or more embodiments.

FIG. 8 illustrates an example scenario 800 for determining a duration of a scan core scan, according to one or more embodiments. Consider at time point $T_0$, the secondary device can determine that main core 802 will engage an MC reception duration 804, or otherwise not busy, with a starting time $T_1$ ending time $T_5$. The secondary device can further determine that the scan core 806 is either scheduled for an SC scan duration 808 with a starting time $T_2$ and an ending time at $T_6$, or the scan core 806 is not scheduled to perform any SC scan corresponding to the MC reception duration 804. The secondary device can further compare the length of time of the MC reception duration 804 to a threshold duration time. If the length of time MC reception duration 804 is less than the threshold duration time, the secondary device can cause the scan core 806 to no longer perform and scheduled paging messaging scanning.

If, however, the length of time of the MC reception duration 804 is greater than the threshold duration time, the secondary device can schedule an updated SC scan duration 808. This can occur whether there has been a previously schedule SC scan duration 808 or the scan core 806 was not scheduled to perform any paging message scan. If there was a previously scheduled SC scan duration 808, the secondary device can adjust the starting time from $T_2$ to $T_3$. The secondary device can further adjust the ending time from $T_6$ to $T_4$. If the scan core 806 was not previously scheduled to perform a paging message scan, then the secondary device can schedule an SC scan duration from $T_3$ to $T_4$, where a length of time from $T_3$ to $T_4$ is greater than the threshold duration time. During the updated SC scan duration 808, the scan core 806 can scan for a paging message from a primary device. In the event that the scan core 806 detects a paging message, the main core 802 can assist with the paging process.

Figure 9:
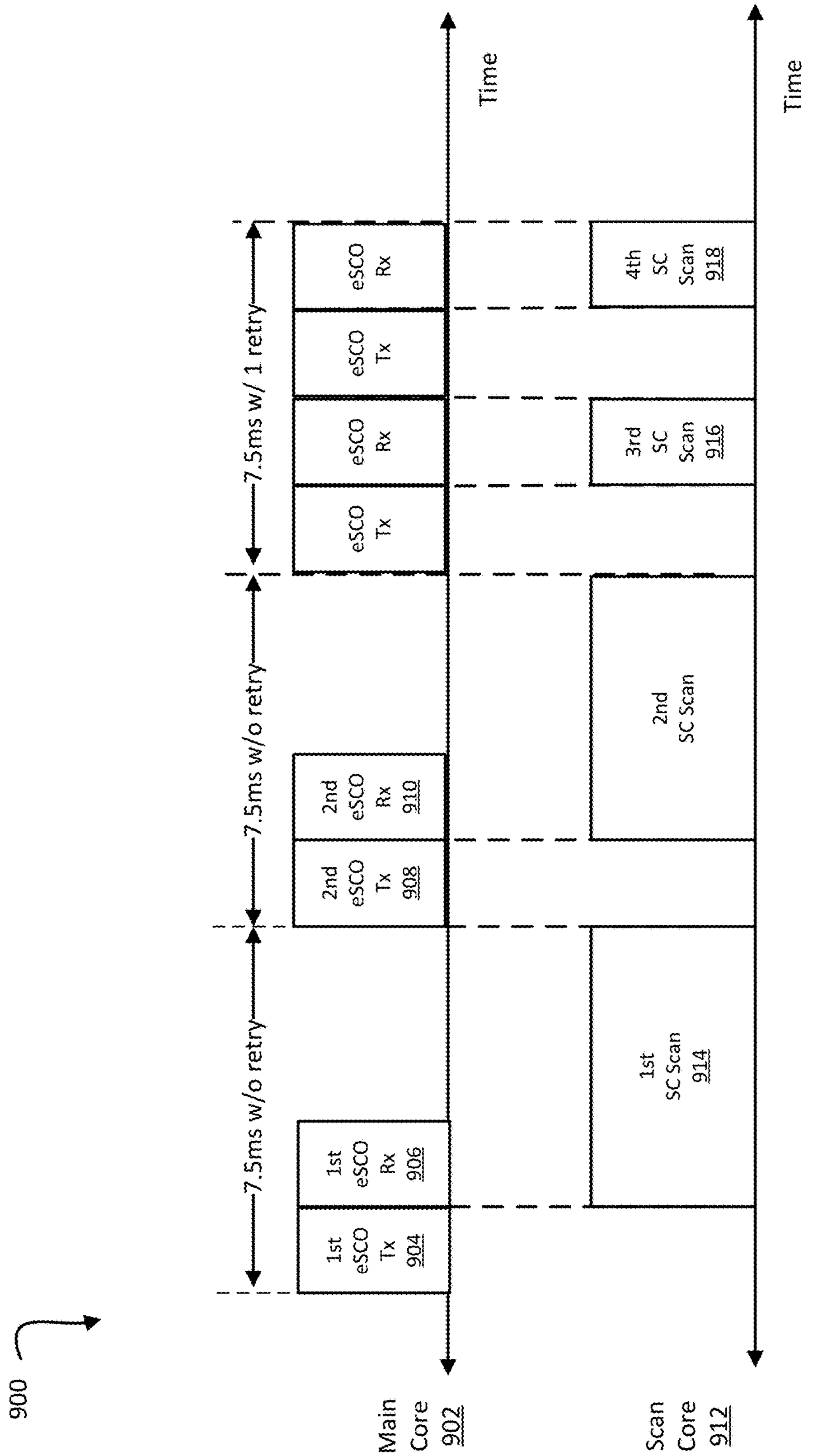
FIG. 9 illustrates smart LE page scanning through ID sensing, according to one or more embodiments.
Figure 10:
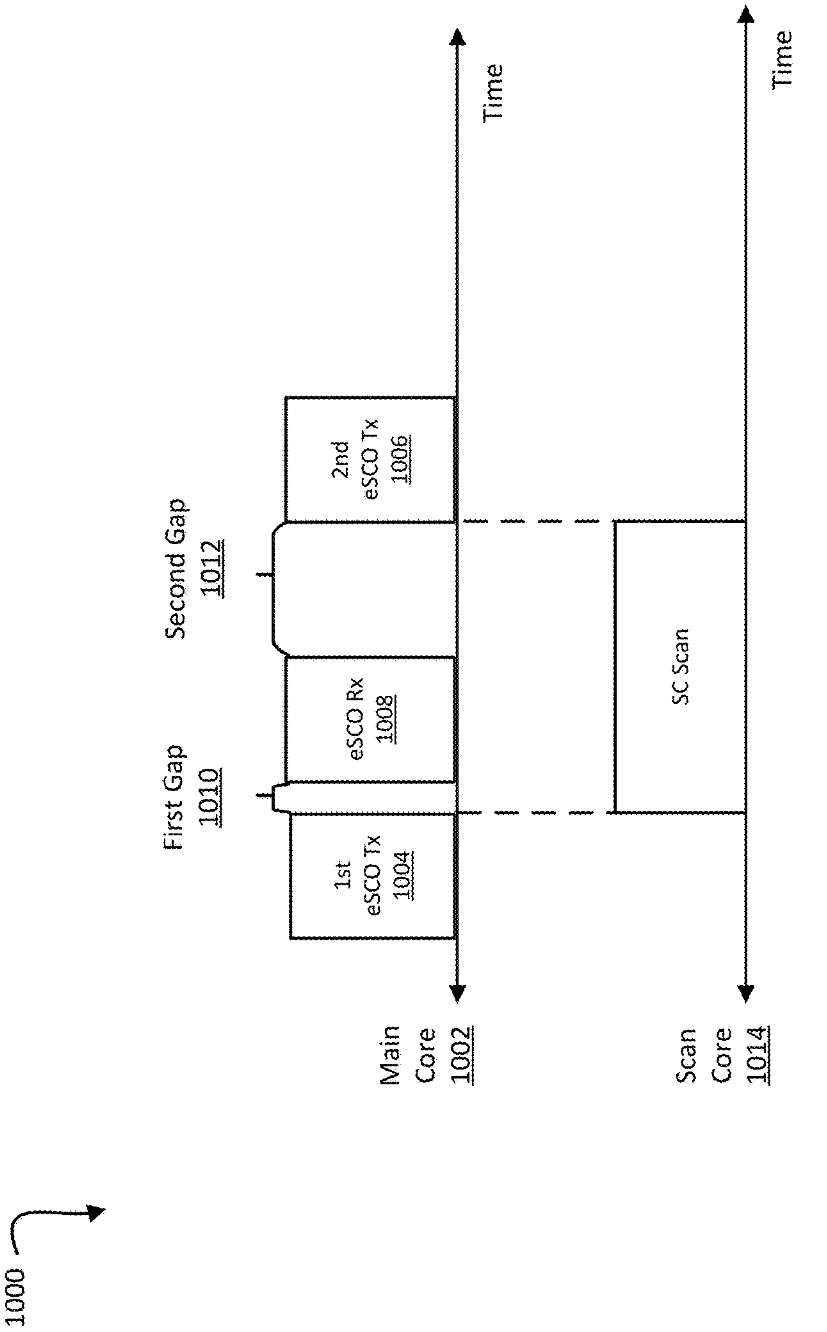
FIG. 10 illustrates smart LE page scanning through ID sensing, according to one or more embodiments.

FIGS. 9 and 10 illustrate that the herein described techniques can be used in relation to the main core's resources being used for various purposes various links, such as (e.g., SCO, eSCO, BT, LE BT, ACL, LE ACL, LE advertisement, thread scan, etc.). FIG. 9 illustrates smart LE page scanning through ID sensing, according to one or more embodiments. In particular FIG. 9 provides an example of using the herein described techniques for when the main core 902 is engaged in synchronous data transmission (e.g., voice data), via eSCO links (as illustrated), or ACL links. As illustrated, the main core 902 can begin a first eSCO transmission duration 904 followed by a first eSCO reception duration 906. After 7.5 milliseconds, the main core 902 can begin a second eSCO transmission duration 908 followed by a second eSCO reception duration 910. During the 7.5 milliseconds, the scan core 912 can undergo a single first SC scan duration 914 during the first eSCO reception duration 906 and a gap between the eSCO reception duration 906 and second eSCO transmission duration 908. As further illustrated, the main core 902 can also perform consecutive eSCO transmissions and reception with no gaps in in between during a 7.5 millisecond time interval. During this time interval, the scan core 912 can scan for a paging message during a third SC scan duration 916 and also a fourth SC scan duration 918.

FIG. 10 illustrates smart LE page scanning through ID sensing, according to one or more embodiments. As illustrated, the main core can be scheduled to transmit information during a first eSCO transmission duration 1004 and a second eSCO transmission duration 1006. Between the first eSCO transmission duration 1004 and a second eSCO transmission duration 1006, the main core 1002 can be scheduled to receive information during an eSCO reception duration 1008. Between the first eSCO transmission duration 1004 and the eSCO reception duration 1008 there can be a first gap 1010. Between the eSCO reception duration 1008 and the second eSCO transmission duration 1006, there can be a second gap 1012. As the main core 1002 is not busy during the first gap 1010, the eSCO reception transmission 1008 and the second eSCO transmission duration 1006, the secondary device can schedule the scan core 1014 to scan for a paging message during an SC scan duration 1016 from an ending time of the first eSCO transmission duration 1004 to the starting time of the second eSCO transmission duration 1006.

Figure 11:
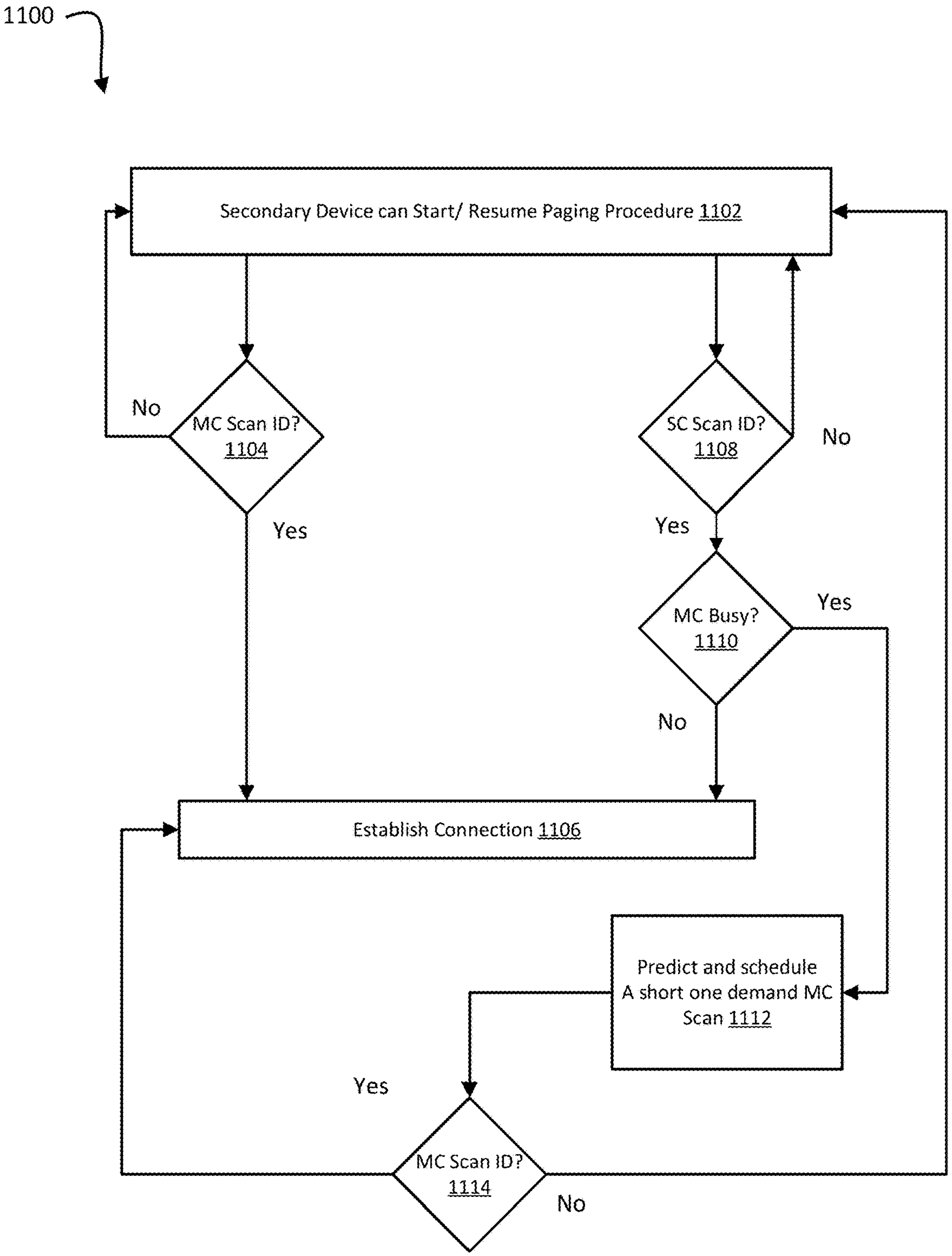
FIG. 11 is an example process flow for smart page scanning through ID sensing, according to one or more embodiments.

FIG. 11 is an example process flow 1100 for smart page scanning through ID sensing, according to one or more embodiments. While some operations of process 1100, 1200, and 1300 are described as being performed by generic computers, it should be understood that any suitable device may be used to perform one or more operations of these processes. Processes 1100, 1200, and 1300 are respectively illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

At 1102, a secondary device can start or resume a paging procedure to detect a paging message from a primary device. The paging message can include a secondary device ID, that the primary device obtained from a previous inquiry process between the primary device and the secondary device. During the paging process, both a main core and a scan core of the secondary device can scan for a paging message from the primary device.

At 1104, the secondary device can determine whether the main core has scanned the secondary device ID. If not, the secondary device can resume the paging process at 1102. If the main core has scanned the secondary device identifier in a paging message from the primary device, the secondary device can establish a connection with the primary device at 1006, as described in FIG. 1.

At 1108, the secondary device can determine whether the scan core has detected the secondary device identifier in a paging message from the primary device. If the scan core has not detected the secondary device identifier, the secondary device can resume the paging process at 1102.

If the scan core has detected the secondary device identifier, the secondary device can determine whether the main core is busy at 1110. For example, the secondary device can determine whether the main core resources are being used, such that the main core cannot assist the paging process. If the main core is not busy then the secondary device can establish a connection with the primary device at 1006, as described in FIG. 1.

If the main core is busy, the secondary device can predict a schedule of the main core for instance that the main core is busy and instances that the main core is not busy at 1112. For example, the secondary device can use a predictive algorithm to predict a schedule of the main core. The predictive algorithm can use as inputs transmission, reception patterns of the main core, types of transmissions and reception that the main core is currently engaging, system time, and other appropriate inputs.

At 1114, the secondary device can determine whether the main core has detected the secondary device identifier in a paging message from the primary device. If the main core has detected the secondary device identifier, the secondary device can establish a connection with the primary device at 1006, as described in FIG. 1. If the main core has not detected the secondary device identifier, secondary device can resume the paging process as 1102.

Figure 12:
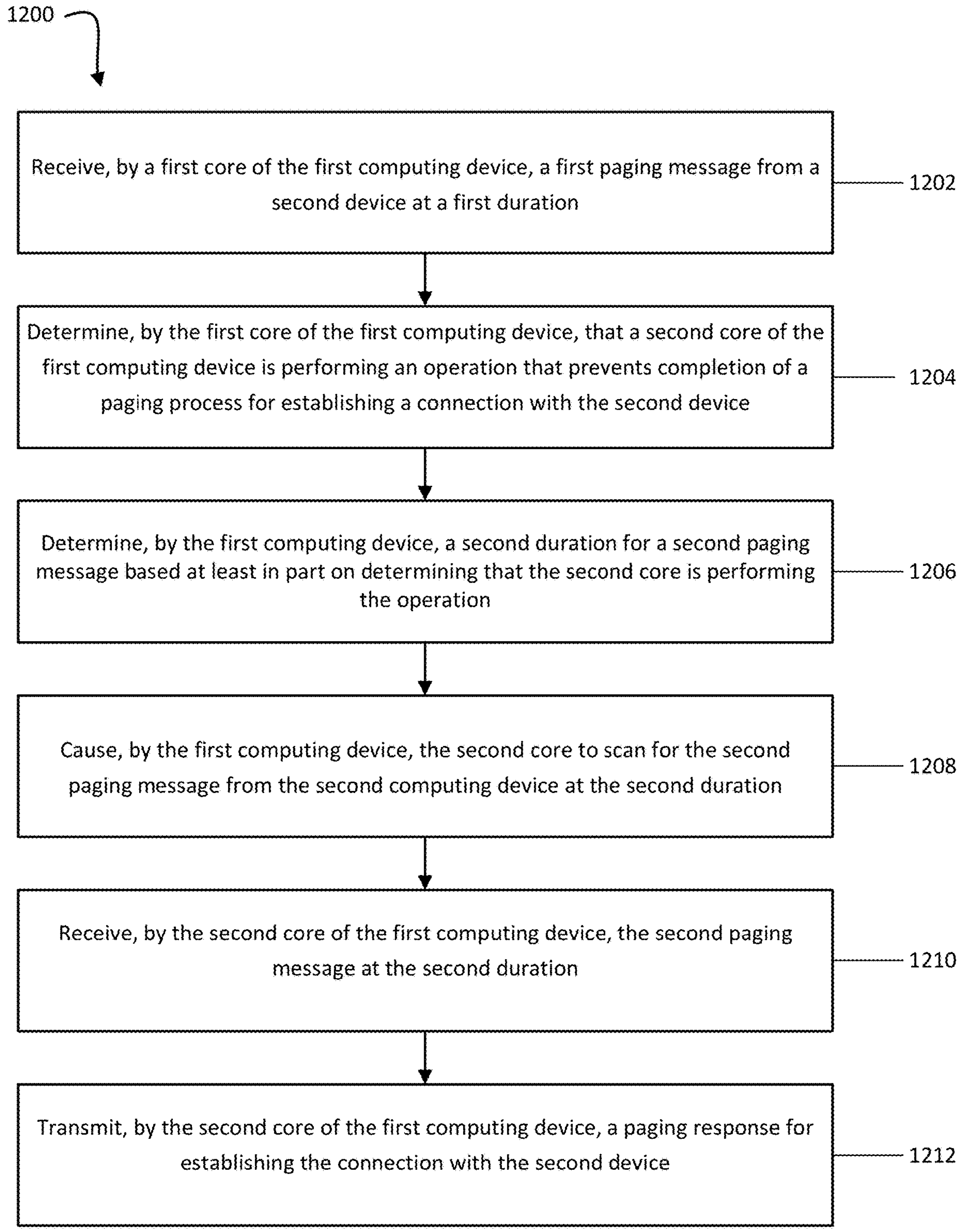
FIG. 12 is an example process flow for smart page scanning through ID sensing, according to one or more embodiments.

FIG. 12 is an example process flow 1200 for smart page scanning through ID sensing, according to one or more embodiments. At 1202, the method can include a first computing device (e.g., a Bluetooth enabled user device) receiving, by a first core of the first computing device, a first paging message from a second computing device at a first duration. The second device can be another Bluetooth enable device, such as a wireless headset. The paging message can include a first device identifier.

At 1204, the method can include the first computing device determining, by the first core of the first computing device, that a second core of the first computing device is performing an operation that prevents completion of a paging process for establishing a connection with the second device. For example, if the second core (e.g., main core) is transmitting, then the first core (e.g., scan core) cannot simultaneously transmit a paging message response.

At 1206, the method can include the first computing device determining a second duration for a second paging message based at least in part on determining that the second core is performing the operation. The first computing device can predict a schedule of the second core, including a time interval that the second core is not busy. In addition, the first computing device can predict a schedule of the paging messages from the second computing device. For example, the second computing device can be configured to transmit paging messages at designated time interval (e.g., once every x milliseconds) and using a designated set of frequencies. The first computing device can be configured with the paging message schedule, and based on the schedule, the first computing device can predict a timing of future paging messages. The first computing device can further detect the frequency of the received paging message. The first computing device can configure the main core to listen for a paging message at that frequency.

At 1208, the method can include the first computing device causing, by the first computing device, the second core to scan for the second paging message from the second computing device at the second duration.

At 1210, the method can include the first computing device receiving, by the second core of the first computing device, the second paging message at the second duration. The second paging message and include the first computing device identifier.

At 1212, the method can include the first computing device transmitting, by the second core of the first computing device, a paging response for establishing the connection with the second device. For example, the secondary device can engage in the paging process with the second computing device as described in FIG. 1.

Figure 13:
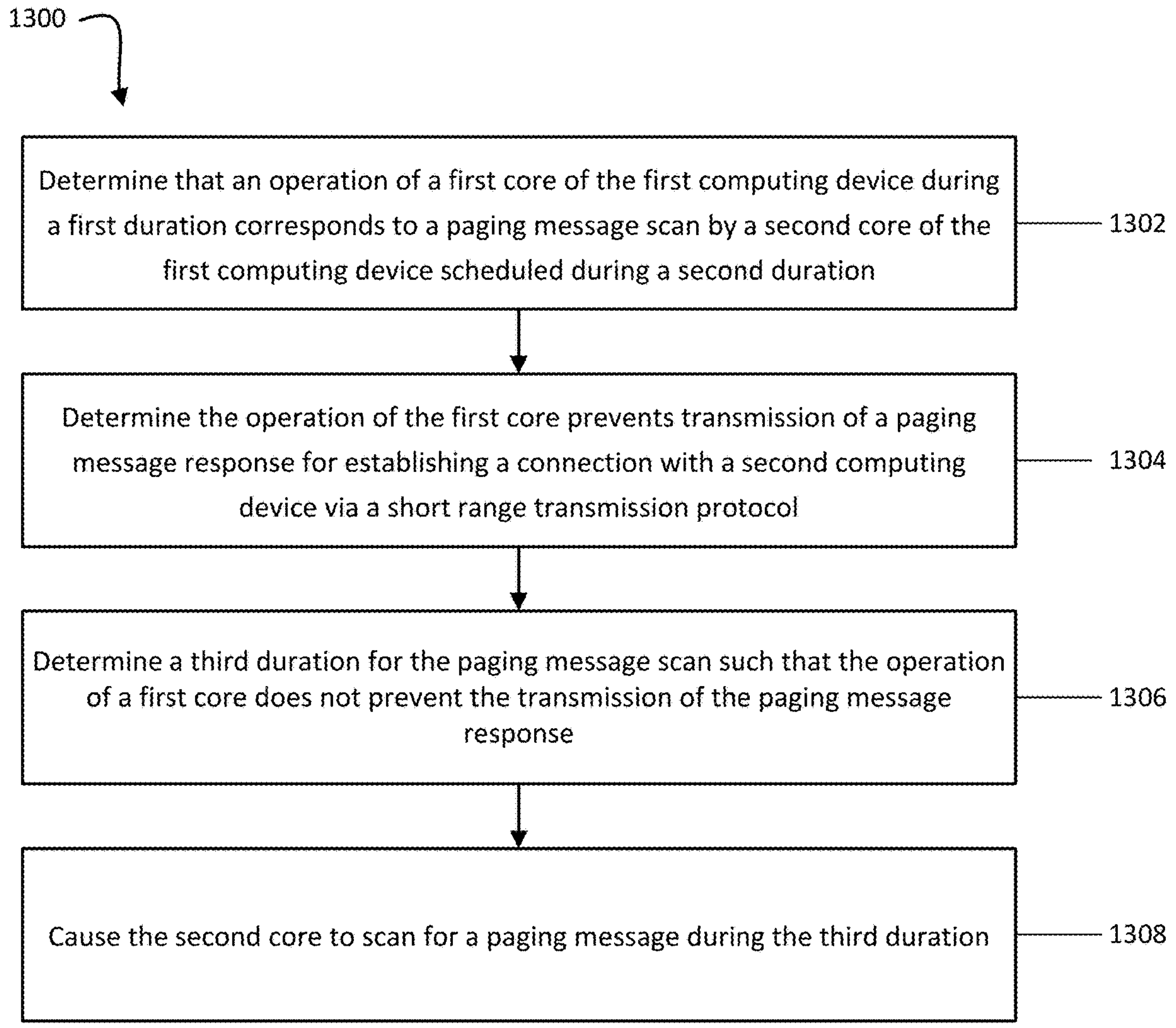
FIG. 13 is an example process flow for smart LE page scanning through ID sensing, according to one or more embodiments.

FIG. 13 is an example process flow 1300 for smart LE page scanning through ID sensing, according to one or more embodiments. At 1302, the method can include a first computing device determining that an operation of a first core of the computing device during a first duration corresponds to a paging message scan by a second core of the computing device scheduled during a second duration. In others main core is performing an operation at the same time that the scan core is scanning for a paging message from a primary device.

At 1304, the method can include a first computing device determining the operation of the first core prevents transmission of a paging message response for establishing a connection with a second computing device via a short range transmission protocol. If, for example, the main core is engaged in a transmission, then the scan core cannot also simultaneously transmit a paging response message to the primary device. The two transmissions can interfere with each other and result in unusable information to the primary device. As any energy expended by the scan during a main core busy state cannot be used to complete the paging process, the secondary device can conserve power by not having the scan core scan during this time period.

At 1306, the method can include a first computing device determining a third duration for the paging message scan such that the operation of a first core does not prevent the transmission of the paging message response. The secondary device can adjust the starting time and the ending time of the SC scan duration, such that the scan core is not scanning for a paging message during a time that the main core is busy. In this sense, the secondary device can conserve power by not having the scan core perform a scanning operation while the main core is busy.

At 1308, the method can include a first computing device causing the second core to scan for a paging message during the third duration. Based on the detecting the paging message during the third duration, the secondary device can perform the rest of the paging process as described in FIG. 1 to establish a connection with the primary device using a short range transmission protocol.

Any of the above-described examples may be combined with any other example (or combination of examples), unless explicitly stated otherwise. The foregoing description of one or more implementations provides illustration and description but is not intended to be exhaustive or to limit the scope of embodiments to the precise form disclosed. Modifications and variations are possible in light of the above teachings or may be acquired from practice of various embodiments.

Although specific embodiments have been described, various modifications, alterations, alternative constructions, and equivalents are also encompassed within the scope of the disclosure. Embodiments are not restricted to operation within certain specific data processing environments but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques, including but not limited to conventional techniques for inter-process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate, and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method performed by a first computing device, the method comprising:

receiving, by a first core of the first computing device, a first paging message from a second computing device at a first duration, wherein the first computing device comprises a dual core architecture, and wherein the first core of the dual core architecture is a scan core;

determining, by first computing device, that a second core of the first computing device is performing an operation that prevents completion of a paging process for establishing a connection with the second computing device, wherein the second core of the dual core architecture is a main core;

determining, by the first computing device, a second duration for a second paging message based at least in part on determining that the second core is performing the operation that prevents completion of the paging process;

causing, by the first computing device, the second core to scan for the second paging message from the second computing device at the second duration;

receiving, by the second core of the first computing device, the second paging message at the second duration; and transmitting, by the second core of the first computing device, a paging response for establishing the connection with the second computing device.

2. The method of claim 1, wherein the first computing device is configured with a paging message timing pattern, and wherein determining the second duration for the second paging message based at least in part on the first paging message comprises:

determining a timing of receipt of the first paging message; and determining a timing of the second paging message based at least in part on the timing of the first paging message and the paging message timing pattern.

3. The method of claim 1, wherein the method further comprises:

determining a scheduled third duration for paging message scanning by the first core, wherein the second duration is determined to be prior to the scheduled third duration.

4. The method of claim 1, wherein the method further comprises:

determining a scheduled third duration for paging message scanning by the second core, wherein the second duration is determined to be prior to the scheduled third duration.

5. The method of claim 1, wherein the method further comprises:

determining that the first paging message comprises a first computing device identifier; and determining whether the second core is performing the operation based at least in part on determining that the first paging message comprises the first computing device identifier.

6. The method of claim 1, wherein determining that the second core of the first computing device is performing the operation that prevents completion of the paging process for establishing the connection with the second computing device comprises:

determining that the second core is engaged in a transmission operation.

7. The method of claim 1, wherein the method further comprises:

determining a frequency of the first paging message; and transmitting instructions to the second core to scan for the second paging message at the frequency.

8. A first computing device comprising:

one or more processors; and one or more computer-readable media having stored thereon a sequence of instructions, when executed, cause the one or more processors to:

receive, by a first core of the first computing device, a first paging message from a second computing device at a first duration, wherein the first computing device comprises a dual core architecture, and wherein the first core of the dual core architecture is a scan core;

determine, by the first computing device, that a second core of the first computing device is performing an operation that prevents completion of a paging process for establishing a connection with the second computing device, wherein the second core of the dual core architecture is a main core;

determine, by the first computing device, a second duration for a second paging message based at least in part on determining that the second core is performing the operation that prevents completion of the paging process;

cause, by the first computing device, the second core to scan for the second paging message from the second computing device at the second duration;

receive, by the second core of the first computing device, the second paging message at the second duration; and transmit, by the second core of the first computing device, a paging response for establishing the connection with the second computing device.

9. The first computing device of claim 8, wherein the first computing device is configured with a paging message timing pattern, and wherein determining the second duration for the second paging message based at least in part on the first paging message comprises:

determining a timing of receipt of the first paging message; and determining a timing of the second paging message based at least in part on the timing of the first paging message and the paging message timing pattern.

10. The first computing device of claim 8, wherein the sequence of instructions, when executed, further cause the one or more processors to:

determine a scheduled third duration for paging message scanning by the first core, wherein the second duration is determined to be prior to the scheduled third duration.

11. The first computing device of claim 8, wherein the sequence of instructions, when executed, further cause the one or more processors to:

determining a scheduled third duration for paging message scanning by the second core, wherein the second duration is determined to be prior to the scheduled third duration.

12. The first computing device of claim 8, wherein the sequence of instructions, when executed, further cause the one or more processors to:

determine that the first paging message comprises a first computing device identifier; and determine whether the second core is performing the operation based at least in part on determining that the first paging message comprises the first computing device identifier.

13. The first computing device of claim 8, wherein determining that the second core of the first computing device is performing the operation that prevents completion of the paging process for establishing the connection with the second computing device comprises:

determining that the second core is engaged in a transmission operation for the first computing device.

14. The first computing device of claim 8, wherein the sequence of instructions, when executed, further cause the one or more processors to:

determine a frequency of the first paging message; and transmit instructions to the second core to scan for the second paging message at the frequency.

15. One or more non-transitory computer-readable media having stored thereon a sequence of instructions that, when executed by one or more processors of a first computing device, cause the one or more processors to:

receive, by a first core of the first computing device, a first paging message from a second computing device at a first duration, wherein the first computing device comprises a dual core architecture, and wherein the first core of the dual core architecture is a scan core;

determine, by the first core of the first computing device, that a second core of the first computing device is performing an operation that prevents completion of a paging process for establishing a connection with the second computing device, wherein the second core of the dual core architecture is a main core;

determine, by the first computing device, a second duration for a second paging message based at least in part on determining that the second core is performing the operation that prevents completion of the paging process;

cause, by the first computing device, the second core to scan for the second paging message from the second computing device at the second duration;

receive, by the second core of the first computing device, the second paging message at the second duration; and transmit, by the second core of the first computing device, a paging response for establishing the connection with the second computing device.

16. The one or more non-transitory computer-readable media of claim 15, wherein the first computing device is configured with a paging message timing pattern, and wherein determining the second duration for the second paging message based at least in part on the first paging message comprises:

determining a timing of receipt of the first paging message; and determining a timing of the second paging message based at least in part on the timing of the first paging message and the paging message timing pattern.

17. The one or more non-transitory computer-readable media of claim 15, wherein the sequence of instructions, when executed, further cause the one or more processors to:

determine a scheduled third duration for paging message scanning by the first core, wherein the second duration is determined to be prior to the scheduled third duration.

18. The one or more non-transitory computer-readable media of claim 15, wherein determining that the second core of the first computing device is performing the operation that prevents completion of the paging process for establishing the connection with the second computing device comprises:

determining that the second core is engaged in a transmission operation for the first computing device.

19. The method according to claim 1, wherein the main core is a processor configured with reception capabilities and transmission capabilities, and wherein the scan core is a processor configured with reception capabilities.

20. The method according to claim 1, wherein the scan core is a processor configured with lower power processing capabilities than a processor of the main core.

* * * * *